United States Patent
Saitou et al.

(10) Patent No.: US 10,526,491 B2
(45) Date of Patent: Jan. 7, 2020

(54) QUINACRIDONE PIGMENT COMPOSITION FOR COLORING RESINS

(71) Applicant: DIC Corporation, Tokyo (JP)

(72) Inventors: Shingo Saitou, Sakura (JP); Hideki Okabe, Sakura (JP); Yukiko Higuchi, Kamisu (JP)

(73) Assignee: DIC Corporation, Tokyo (JP)

( * ) Notice: Subject to any disclaimer, the term of this patent is extended or adjusted under 35 U.S.C. 154(b) by 124 days.

(21) Appl. No.: 15/555,266

(22) PCT Filed: May 12, 2016

(86) PCT No.: PCT/JP2016/064143
§ 371 (c)(1),
(2) Date: Sep. 1, 2017

(87) PCT Pub. No.: WO2017/002459
PCT Pub. Date: Jan. 5, 2017

(65) Prior Publication Data
US 2018/0346730 A1 Dec. 6, 2018

(30) Foreign Application Priority Data

Jun. 29, 2015 (JP) ................................ 2015-129884

(51) Int. Cl.
| C09B 48/00 | (2006.01) |
|---|---|
| C08J 3/22 | (2006.01) |
| C08K 5/3437 | (2006.01) |
| C08L 101/00 | (2006.01) |
| C09B 47/08 | (2006.01) |
| C09B 67/22 | (2006.01) |

(52) U.S. Cl.
CPC ................ C09B 48/00 (2013.01); C08J 3/22 (2013.01); C08K 5/3437 (2013.01); C08L 101/00 (2013.01); C09B 47/085 (2013.01); C09B 67/0033 (2013.01); C09B 67/0036 (2013.01); C08J 2323/06 (2013.01); C08J 2377/02 (2013.01)

(58) Field of Classification Search
CPC ...... C08J 3/22; C08J 2323/06; C08J 2377/02; C08L 101/00; C08K 5/3437; C09B 48/00; C09B 67/0036; C09B 47/04; C09B 47/085; C09B 67/0033
See application file for complete search history.

(56) References Cited

U.S. PATENT DOCUMENTS

| 6,033,444 A * | 3/2000 | Ahlinder | C09B 67/0033 |
| | | | 106/495 |
| 6,090,196 A * | 7/2000 | Babler | C09B 48/00 |
| | | | 106/495 |
| 2010/0092887 A1* | 4/2010 | Feldhues | C09B 48/00 |
| | | | 430/270.1 |
| 2012/0126184 A1 | 5/2012 | Vairon et al. | |
| 2016/0053081 A1* | 2/2016 | Harada | C09B 67/0033 |
| | | | 524/88 |

FOREIGN PATENT DOCUMENTS

| CN | 1201055 A | 12/1998 |
| CN | 101659807 A | 3/2010 |
| JP | 04-311769 A | 11/1992 |
| JP | 2004-083673 A | 3/2004 |
| JP | 2004258134 A * | 9/2004 |
| JP | 2012-530165 A | 11/2012 |
| JP | 2014-040035 A | 3/2014 |

OTHER PUBLICATIONS

International Search Report dated Jun. 7, 2016, issued for PCT/JP2016/064143.

* cited by examiner

*Primary Examiner* — Anthony J Green
(74) *Attorney, Agent, or Firm* — Locke Lord LLP; James E. Armstrong, IV; Nicholas J. DiCeglie, Jr.

(57) ABSTRACT

Provided is a quinacridone pigment composition for coloring plastics, particularly engineering plastics. The quinacridone pigment composition has high transparency and high color strength and also has high heat resistance, so that discoloration during molding of a resin (a color change of a molded plate) is very small. Also provided are a masterbatch and a resin molded product that contain the pigment composition. The pigment composition for coloring resins contains a quinacridone pigment and a pigment that absorbs fluorescence in a wavelength range of 500 to 600 nm. The inventors have found that, when the pigment composition is used as a colorant of a resin molded product subjected to a high-temperature thermal history, the change in color, i.e., the discoloration, of the resin molded product obtained is very small. Thus, the present invention has been completed.

4 Claims, No Drawings

QUINACRIDONE PIGMENT COMPOSITION FOR COLORING RESINS

TECHNICAL FIELD

The present invention relates to a quinacridone pigment composition for coloring plastics, particularly engineering plastics, to a masterbatch containing the pigment composition, and to a resin molded product containing the pigment composition.

BACKGROUND ART

Among plastic resins, engineering plastic resins are characterized by excellent shock resistance, heat resistance, electric properties, and transparency and high processing accuracy. However, they often have high melting points and therefore need to be processed at higher temperatures than general-purpose plastic resins.

Pigments used to color engineering plastics are required to have high heat resistance and high color strength. However, at present, not many red pigments have heat resistance high enough for engineering plastics such as nylon. No commercial pigments meet the required characteristics such as heat resistance and color strength, and there is a need for pigments having higher heat resistance.

In an invention proposed in order to improve heat resistance (reference 1), the diameter of primary particles is increased, but transparency and color strength are low. The large particle size is advantageous in terms of heat resistance but causes a problem in coloring performance.

Reducing the size of the primary particles allows an improvement in color strength but makes it difficult to disperse the particles and causes deterioration in heat resistance because of the particle size. It is therefore difficult to achieve color strength and heat resistance simultaneously.

CITATION LIST

Patent Literature

PTL 1: Japanese Unexamined Patent Application Publication No. 4-311769

SUMMARY OF INVENTION

Technical Problem

An object of the present invention is to provide a quinacridone pigment composition for coloring plastics, particularly engineering plastics. The quinacridone pigment composition has high transparency and high color strength and also has high heat resistance, so that discoloration during molding of a resin (a color change of a molded plate) is very small. A masterbatch and a resin molded product that contain the pigment composition are also provided.

Solution to Problem

In view of the above circumstances, the present inventors have conducted extensive studies and found that, when a quinacridone pigment composition including a quinacridone pigment and a pigment that absorbs fluorescence in a wavelength range of 500 to 600 nm is used as a colorant of a resin molded product subjected to a high-temperature thermal history, the change in color, i.e., the discoloration, of the resin molded product obtained is very small. Thus, the present invention has been completed.

Accordingly, the present invention is a pigment composition for coloring resins that comprises: a quinacridone pigment; and a pigment that absorbs fluorescence in a wavelength range of 500 to 600 nm.

In some embodiments, the pigment composition for coloring resins according to the invention comprises the pigment that absorbs fluorescence in a wavelength range of 500 to 600 nm in an amount of 0.01 to 3 parts based on 100 parts of the quinacridone pigment.

In some embodiments of the pigment composition for coloring resins according to the invention, the quinacridone pigment comprises at least one of quinacridone pigments represented by general formula (1) below or a quinacridone solid solution:

[Chem. 1]

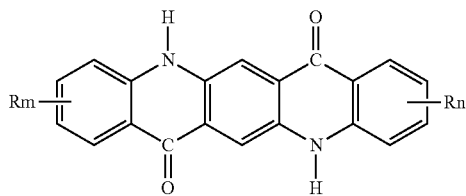

(wherein R's are each independently F, Cl, Br, an alkyl group having 1 to 3 carbon atoms, or an alkoxy group having 1 to 3 carbon atoms, and m and n are each independently 0 to 2).

In the pigment composition for coloring resins, the pigment that absorbs fluorescence in a wavelength range of 500 to 600 nm comprises at least one pigment selected from a blue pigment and a violet pigment.

In the pigment composition for coloring resins, the blue pigment comprises at least one pigment selected from C.I. Pigment Blue 15:1, 15:2, 15:3, 15:4, 15:5, 15:6, 28, 29, and 60.

In the pigment composition for coloring resins, the violet pigment comprises at least one pigment selected from C.I. Pigment Violet 19, 23, and 29.

Also provided are a dry color and a masterbatch each comprising the above-described pigment composition for coloring resins.

The present invention also relates to a resin molded product obtained from the dry color or the masterbatch.

Advantageous Effects of Invention

When the quinacridone pigment composition of the present invention that is used as a colorant for coloring plastics, particularly engineering plastic, is used for a resin molded product subjected to a high-temperature thermal history, fluorescence in a visible wavelength range that is caused by dissolution of the quinacridone due to heat is absorbed by the fluorescence-absorbing material, so that discoloration can be prevented as much as possible. The quinacridone pigment composition of the present invention has high heat resistance and therefore causes much less discoloration during molding of a resin. Moreover, a masterbatch having high transparency and high color strength and a resin molded product can be obtained.

DESCRIPTION OF EMBODIMENTS

The details of the present invention will be described.

Generally, an engineering plastic is molded using, for example, an injection molding machine at a high temperature of about 240 to about 320° C., but this depends on the resin used. Pigments used for coloring resins to be molded are required to have high heat resistance, and pigments that will be thermally altered cannot be used for engineering plastics. The present inventors have conducted various studies and found that the main reason a quinacridone pigment discolors during molding of a resin is that the quinacridone pigment dissolves into the engineering plastic resin. The phenomenon that the quinacridone pigment partially dissolves and discolors occurs when the pigment partially dissolves into the engineering plastic during high-temperature molding and is present in the form of molecules. In this case, fluorescence is emitted at a wavelength of 500 to 600 nm that differs from the wavelength of the light emitted from the pigment crystals themselves. This is the main reason for the discoloration. The inventors have found that, to prevent discoloration, the fluorescence generated due to the dissolution of the quinacridone pigment is absorbed to cancel the fluorescence. This can be achieved by selectively absorbing the fluorescence generated due to the dissolution of the quinacridone pigment by a blue or violet pigment having a specific absorption spectrum.

Generally, when a black pigment such as carbon that absorbs light over the entire wavelength range is added to a quinacridone pigment, necessary reflection from the quinacridone pigment is also absorbed. This is not suitable because a large change in base hue occurs. It has been found that, by adding a small amount of a blue or violet pigment, fluorescence is absorbed, so that the significant effect that discoloration can be considerably reduced even during high-temperature molding can be obtained.

The quinacridone pigment in the quinacridone pigment composition of the present invention is at least one quinacridone pigment selected from quinacridone pigments represented by general formula (1) below or a quinacridone solid solution:

[Chem. 2]

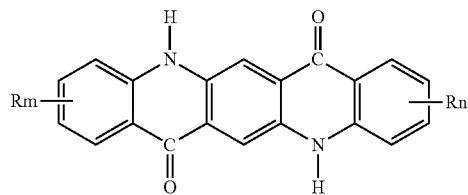

(wherein R's are each independently F, Cl, Br, an alkyl group having 1 to 3 carbon atoms, or an alkoxy group having 1 to 3 carbon atoms, and m and n are each independently 0 to 2).

The quinacridone pigment is intended to encompass substituted and unsubstituted quinacridones represented by general formula (1) and manufactured by known manufacturing methods, mixtures thereof, and solid solutions thereof.

Quinacridones are aromatic polycyclic pigments with orange to red to magenta colors. These quinacridones are used as coloring materials in known fields and are widely used common pigments because of their color strength and hue. However, when these quinacridones are used to color engineering plastics that are to be subjected to a high-temperature thermal history, the pigments are required to have very high levels of structural stability, dispersion stability, and hue stability. A quinacridone forms intermolecular hydrogen bonding and is therefore a pigment with very high stabilities although its molecular weight is small.

However, since engineering plastics are subjected to high temperature during molding, the use of quinacridone pigments for these engineering plastics is very limited because the quinacridone pigments are significantly discolored at high temperature.

In the quinacridone pigment composition of the present invention, 0.01 to 3 parts of a pigment that absorbs fluorescence in a wavelength range of 500 to 600 nm is mixed with 100 parts of the quinacridone pigment or the quinacridone solid solution to prepare the quinacridone pigment composition. The pigment is an inorganic pigment, an organic pigment, a metal complex, etc. In terms of absorption of organic fluorescence wavelengths, it is preferable to add a large amount of the pigment that absorbs fluorescence in a wavelength range of 500 to 600 nm. However, the amount that inhibits the color development of the quinacridone that is essentially necessary is not suitable. In view of the influence on the ability to absorb fluorescence and on the hue, it is more preferable to add 0.01 to 1.0 parts of the pigment that absorbs fluorescence in a wavelength range of 500 to 600 nm to 100 parts of the quinacridone pigment or the quinacridone solid solution.

Among various types of coloring materials used for absorption in the fluorescence wavelength range, at least a blue or violet pigment is preferably used as the pigment that absorbs fluorescence in a wavelength range of 500 to 600 nm because heat resistance is necessary. Since it is necessary for the coloring material used to have heat resistance, a dye cannot be used. However, a metal complex dye having a dye structure with high partial heat resistance can be used. A blue inorganic pigment can also be used.

The blue pigment is preferably a blue or cyan inorganic pigment and is specifically a naphthol AS pigment such as C.I. Pigment Blue 25 or 26, a phthalocyanine pigment such as 15, 15:1, 15:2, 15:3, 15:4, 15:6, 16, 75, or 79, a dye lake pigment such as 1, 24:1, or 56, an anthraquinone-based pigment such as 60 or 64, a cobalt blue-based pigment such as 28, or an ultramarine pigment such as 29. Of these, C.I. Pigment Blue 15:3 which is a copper phthalocyanine having a high fluorescence absorption ability is suitable.

The violet pigment is preferably a dye lake pigment such as C.I. Pigment Violet 1, 2, 3, or 27, a naphthol AS pigment such as 13, 17, 25, or 50, an anthraquinone lake pigment such as 5:1, a quinacridone pigment such as 19, a dioxazine pigment such as 23 or 37, a perylene pigment such as 29, isoviolanthrone such as 31, a benzimidazolone pigment such as 32, or a thioindigo pigment such as 38. Of these, C.I. Pigment Violet 23 having a high fluorescence absorption ability is suitable.

The blue and violet pigments usable as the pigment that absorbs fluorescence in a wavelength range of 500 to 600 nm may be used alone or in any ratio. The blue pigment and/or the violet pigment may be added to the quinacridone pigment or the solid solution during a dehydration condensation reaction of the quinacridone, during the formation of the solid solution, or during crystal control treatment of the quinacridone pigment, may be added to a slurry during subsequent washing with an organic solvent or a water-based solvent, or may be added as a powder to the quinacridone pigment. The blue pigment and/or the violet pigment added to the quinacridone pigment may be in the form of a slurry or powder as described above, and any method using a mixer or using rolls, a kneader, etc. which cause shear stress can be used so long as a uniform mixture is obtained.

Examples of the plastic resin used include polyamides (nylons), polyethylene terephthalate, polybutylene terephthalate, polycarbonates, polyimides, polyphenylene sulfide, polysulfones, polyethersulfones, polyether ether ketone, polyamide-imides, acrylonitrile-styrene resins, polyester resins, acrylic resins, methacrylic-styrene resins, and ABS resins.

(Method for Coloring Engineering Plastic Resin)

To color an engineering plastic resin, a dry color is first produced. One part of a pigment produced and 1 part of magnesium stearate are weighed into a sample bag and mixed by rubbing the bag with the hand for 5 minutes to thereby obtain a dry color.

(Method for Producing Masterbatch)

When a masterbatch is produced, 1 part of the pigment produced, 1 part of magnesium stearate, and 3 parts of a prescribed plastic resin are weighed and kneaded using an extruder PCM30 manufactured by Ikegai Ironworks Corp. at the molding temperature of the resin to thereby obtain a masterbatch sample.

(Method for Producing Molded Sample)

To produce a resin molded product molded using the dry color, 100 parts of a prescribed plastic resin and 0.1 parts of the dry color are placed in a bag and shaken with the hand. The resulting dry color is subjected to injection molding using an injection molding machine PS60E9A manufactured by NISSEI PLASTIC INDUSTRIAL Co., Ltd. under one of the following prescribed temperature conditions 1 to 3, whereby a molded product sample is obtained.

Molding condition 1: 280° C.
Molding condition 2: 300° C.
Molding condition 3: 320° C.

Separately, 100 parts of polypropylene (NOVATEC PP BC3 manufactured by Japan Polypropylene Corporation) and 0.1 parts of the dry color are placed in a bag and shaken with the hand. The resulting dry color is subjected to injection molding using an injection molding machine PS60E9A manufactured by NISSEI PLASTIC INDUSTRIAL Co., Ltd. at 220° C., whereby a molded product sample is obtained.

(Wavelength of Fluorescence)

In the polypropylene, fluorescence emission due to dissolution does not occur. Therefore, this sample is used as a reference when a A spectral reflectance at a fluorescence wavelength is computed.

Next, a method for measuring the discoloration of each of the resin molded products will be shown.

(Method for Measuring Discoloration)

Values obtained by subjecting the molded samples obtained to measurement using a spectrophotometer (colorimeter) Datacolor 650 manufactured by Datacolor international are employed. The measurement results under the molding condition 1 are used as a reference to determine a color difference ΔE. The spectral reflectance of each sample at a fluorescence wavelength of 550 nm is measured. The Δ spectral reflectance is determined using, as the reference, the spectral reflectance of the molded polypropylene at the fluorescence wavelength. The larger the color difference ΔE and the Δ spectral reflectance at a fluorescence wavelength of 550 nm, the larger the change in hue from the intended hue to a different hue, and the lower the heat resistance of the coloration.

EXAMPLES

The present invention will next be described by way of Examples. In the Examples, "parts" and "%" are on a mass basis unless otherwise specified.

Example 1

100 Parts of C.I. Pigment Red 202 in the form of a powder (Quindo Magenta 228-6863 manufactured by Sun Chemical) and 0.15 parts of C.I. Pigment Blue 15:3 in the form of a powder (FASTOGEN Blue FA5380 manufactured by DIC Corporation) were added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (1). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

Example 2

100 Parts of C.I. Pigment Red 202 in the form of a powder (Quindo Magenta 228-6863 manufactured by Sun Chemical) and 0.15 parts of C.I. Pigment Violet 23 in the form of a powder (FASTOGEN Super Violet LBP02 manufactured by DIC Corporation) were added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (2). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

Example 3

100 Parts of C.I. Pigment Red 202 in the form of a powder (Quindo Magenta 228-6863 manufactured by Sun Chemical) and 0.6 parts of C.I. Pigment Blue 29 in the form of a powder (SunCROMA SWD-5018 Ultramarine Blue manufactured by Sun Chemical) were added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (3). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

Comparative Example 1

100 Parts of C.I. Pigment Red 202 in the form of a powder (Quindo Magenta 228-6863 manufactured by Sun Chemical) was added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (4). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

TABLE 1

| | Quinacridone pigment | Fluorescence inhibitor | ΔE (300° C.) | ΔE (320° C.) | Δ reflectance % |
|---|---|---|---|---|---|
| Example 1 | Pigment Red 202 | Pigment Blue 15:3 | 1.1 | 2.6 | 4.0 |
| Example 2 | Pigment Red 202 | Pigment Violet 23 | 0.9 | 2.2 | 3.7 |
| Example 3 | Pigment Red 202 | Pigment Blue 29 | 1.2 | 2.8 | 4.1 |
| Comparative Example 1 | Pigment Red 202 | None | 3.0 | 7.6 | 6.8 |

As can be clearly seen by comparing Examples 1, 2, and 3 and Comparative Example 1, in the molded products colored with the pigment compositions of the present invention each containing C.I. Pigment Red 202 and one of C.I. Pigment Blue 15:3, C.I. Pigment Violet 23, and C.I. Pigment Blue 29, the heat resistance of the coloration is much higher than that in the molded product sample colored with the conventional pigment composition containing C.I. Pigment Red 202.

Example 4

100 Parts of C.I. Pigment Red 122 in the form of a powder (FASTOGEN SUPER MAGENTA RTS manufactured by DIC Corporation) and 1 part of C.I. Pigment Blue 15:3 in the form of a powder (FASTOGEN Blue FA5380 manufactured by DIC Corporation) were added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (5). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

Comparative Example 2

100 Parts of C.I. Pigment Red 122 in the form of a powder (FASTOGEN SUPER MAGENTA RTS manufactured by DIC Corporation) was added to 5,000 parts of water and stirred for 30 minutes to mix them sufficiently. The resulting mixture was filtered using a Buchner funnel and dried at 98° C. for 12 hours in a box dryer. The dried lumps obtained were pulverized for 10 seconds×three times using a juicer to thereby obtain a sample (6). Nylon 6 (UBE NYLON (1013NW8) manufactured by Ube Industries, Ltd.) and polypropylene (NOVATEC PP BC3 manufactured by Japan Polypropylene Corporation) were used as plastic resins for evaluation, and the evaluation was performed using the above-described dry color production method, the injection molding test, and the discoloration measurement method.

TABLE 2

| | Quinacridone pigment | Fluorescence inhibitor | ΔE (300° C.) | ΔE (320° C.) | Δ reflectance % |
|---|---|---|---|---|---|
| Example 4 | Pigment Red 122 | Pigment Blue 15:3 | 2.3 | 8.1 | 1.1 |
| Comparative Example 2 | Pigment Red 122 | None | 5.2 | 15.2 | 2.4 |

As can be seen by comparing Example 4 and Comparative Example 2, in the molded product colored with the pigment composition of the present invention containing C.I. Pigment Red 122 and C.I. Pigment Blue 15:3, the heat resistance of the coloration is much higher than that in the molded product sample colored with the conventional pigment composition containing C.I. Pigment Red 122.

In the present invention, even when a quinacridone pigment is used for a plastic, particularly an engineering plastic, discoloration during molding of the resin can be reduced because of high heat resistance. Moreover, a masterbatch having high transparency and high color strength and a resin molded product can be obtained.

The invention claimed is:

1. A pigment composition for coloring resins, the pigment composition comprising: a quinacridone pigment; and a pigment that absorbs fluorescence in a wavelength range of 500 to 600 nm,
    wherein the pigment that absorbs fluorescence in a wavelength range of 500 to 600 nm comprises at least one pigment selected from C.I. Pigment Blue 15:1, 15:2, 15:3, 15:4, 15:5, 15:6, 28, 29, and 60, and C.I. Pigment Violet 29;
    and wherein the pigment composition comprises the pigment that absorbs fluorescence in a wavelength range of 500 to 600 nm in an amount of 0.01 to 3 parts by mass based on 100 parts by mass of the quinacridone pigment.

2. The pigment composition for coloring resins according to claim 1, wherein the quinacridone pigment comprises at least one of quinacridone pigments represented by general formula (1) below:

[Chem. 1]

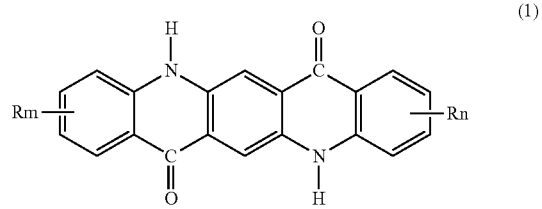

(1)

wherein R's are each independently F, Cl, Br, an alkyl group having 1 to 3 carbon atoms, or an alkoxy group having 1 to 3 carbon atoms, and m and n are each independently 0 to 2.

3. A masterbatch comprising the pigment composition for coloring resins according to claim 1.

4. A resin molded product obtained from the masterbatch according to claim 3.

* * * * *